(12) United States Patent
Valade et al.

(10) Patent No.: US 7,043,278 B2
(45) Date of Patent: May 9, 2006

(54) METHOD OF NOTIFYING THE ARRIVAL OF AN EVENT AT A MOBILE TERMINAL, AND A MOBILE TERMINAL FOR IMPLEMENTING THE METHOD

(75) Inventors: Eric Valade, Sarge les le Mans (FR); Pierre Bonnard, Suresnes (FR)

(73) Assignee: Alcatel, Paris (FR)

( * ) Notice: Subject to any disclaimer, the term of this patent is extended or adjusted under 35 U.S.C. 154(b) by 522 days.

(21) Appl. No.: 10/142,883

(22) Filed: May 13, 2002

(65) Prior Publication Data

US 2002/0168990 A1    Nov. 14, 2002

(30) Foreign Application Priority Data

May 14, 2001    (FR) .................................. 01 06304

(51) Int. Cl.
*H04M 1/00*    (2006.01)

(52) U.S. Cl. ................. 455/567; 455/552.1; 455/556.1; 455/557

(58) Field of Classification Search ................ 455/567, 455/417, 412.2, 412.3, 552.1, 556.1, 557, 455/575.1, 550.1; 340/7.58, 7.59, 7.6, 7.61, 340/7.62
See application file for complete search history.

(56) References Cited

U.S. PATENT DOCUMENTS

| 6,061,570 | A | 5/2000 | Janow |
| 6,218,958 | B1* | 4/2001 | Eichstaedt et al. ..... 340/825.46 |
| 6,263,218 | B1* | 7/2001 | Kita ........................... 455/567 |
| 6,650,231 | B1* | 11/2003 | Byrne ..................... 340/311.1 |
| 2002/0137552 | A1* | 9/2002 | Cannon et al. ............. 455/567 |

FOREIGN PATENT DOCUMENTS

| DE | 197 49 730 A1 | 5/1999 |
| WO | WO 00/33468 | 6/2000 |

* cited by examiner

*Primary Examiner*—Temica Beamer
(74) *Attorney, Agent, or Firm*—Sughrue Mion, PLLC

(57) ABSTRACT

The present invention relates to a method of notifying the arrival of an incoming event at a mobile terminal connected by communication means to a terminal-to-be-notified that is separate from the mobile terminal. The method comprises the following operations at the time of arrival at the mobile terminal of an incoming event identified by an incoming event type:

comparing the incoming event type with an incoming event type identifier contained in a previously activated incoming event management profile, and sending a notification message to the terminal-to-be-notified whose identifier is contained in the activated management profile if the incoming event type corresponds to an incoming event type of the activated management profile.

26 Claims, 2 Drawing Sheets

METHOD OF NOTIFYING THE ARRIVAL OF AN EVENT AT A MOBILE TERMINAL, AND A MOBILE TERMINAL FOR IMPLEMENTING THE METHOD

The present invention relates to a method of notifying events received by one mobile terminal to another terminal connected to said one mobile terminal, and the invention also relates to a mobile terminal for implementing the method.

BACKGROUND OF THE INVENTION

The user of a mobile terminal, in particular a mobile telephone, may not have easy access to it, for example because it is in a suitcase or a handbag and is not within easy reach, or the user is in a meeting, or the user does not hear the telephone ringing because of background noise, or the user may have left the mobile telephone somewhere else.

In this situation, in the case of telephone calls, there is generally a voicemail service enabling users to consult calls that they have not been able to receive directly. The arrival of a telephone call recorded by the voicemail service is notified to users by a message displayed on their mobile telephone, and thus users are informed of the arrival of a message when they again have access to their mobile telephone.

At present, mobile telephones do not receive only telephone calls. They can also receive files or faxes, necessitating the connection of the mobile terminal to a data processing terminal. Mobile terminals can also receive text, sound, or image messages (in particular text messages conforming to the Short Message Service (SMS) protocol).

All the above messages are notified to users on their mobile telephone, as a result of which users know that they can download or consult the data received, for example e-mails, missed calls, multimedia data, etc.

All the above messages, regardless of their type, are referred to generically as "events" in the remainder of the description.

Existing notification solutions are not satisfactory, however. This is because users have no choice as to how the arrival of an event is notified to them. They can be notified only via their mobile telephone, which is not necessarily easily accessible.

OBJECTS AND SUMMARY OF THE INVENTION

An object of the present invention is therefore to provide a method of notifying the arrival of an event at a mobile telephone that is more flexible than the prior art methods.

To this end the present invention proposes a method of notifying the arrival of an incoming event at a mobile terminal connected by communication means to another terminal, called the terminal-to-be-notified, which method comprises the following operations at the time of arrival at said mobile terminal of an incoming event identified by an incoming event type:

comparing the incoming event type with an incoming event type identifier contained in a previously activated incoming event management profile, and sending a notification message to said terminal-to-be-notified whose identifier is contained in said activated management profile if the incoming event type corresponds to an incoming event type of said activated management profile.

By means of the method of the invention, users of mobile telephones constituting the mobile terminals to which the method of the invention relates can therefore define their own profiles, enabling them to manage incoming events that reach their mobile telephone, in particular when they do not have access to their mobile telephone. These profiles contain an incoming event type identifier (call, e-mail, SMS text message, etc.) and a terminal-to-be-notified identifier (personal computer, personal digital assistant (PDA), etc.). The profile can specify that notification messages be sent to one or more predetermined terminals, depending on the incoming event type.

For example, if a user is in a meeting and using a personal computer, the management profile can specify that all incoming events reaching the mobile telephone are to be notified by means of a message appearing on the computer screen, or that only electronic mail (e-mail) type incoming events are to be notified in this way.

The method of the invention is therefore much more flexible, and compared with prior art methods it provides mobile telephone users with greatly enhanced facilities to direct incoming events where and when they want.

An advantageous embodiment of the method of the invention includes an initialization phase comprising the following operations:

storing in memory an incoming event management profile containing an incoming event type identifier and a terminal-to-be-notified identifier, and activating a management profile to indicate that said incoming events must be processed in compliance with the management profile that is activated.

Accordingly, users can program their mobile telephone to apply the management profile of their choice.

The incoming events managed in the management profiles of the method of the invention can be of any type likely to reach a mobile telephone, for example telephone calls, facsimile messages, SMS text messages, electronic mail messages (e-mails), etc.

The invention enables the arrival of an event at a mobile terminal to be notified to any type of terminal connected thereto over a wireless interface, for example a personal computer, a personal digital assistant, another mobile terminal, a headset, a wristwatch, etc. More generally, the arrival of an event can be notified to any type of terminal able to communicate with the mobile telephone and to issue a notification for the attention of the user in the form of an audible, vibratory, visual, etc. message.

It is highly advantageous for the communication means between the mobile terminal and the terminal-to-be-notified to include a wireless interface. In this case, the notification message can be transmitted in compliance with the Bluetooth protocol, which is described in the document "Bluetooth—The universal Interface for ad hoc, wireless connectivity" published in Ericsson Review, No. 3, 1998, Ericsson, Stockholm, pages 110 to 117, for example, and is a universal interface in the frequency band around 2.45 GHz enabling "wireless" interconnection of and communication between portable electronic devices using suitable short-range networks. The Bluetooth protocol is therefore particularly suitable for transmitting notification messages by the method of the invention.

In an implementation of the invention the management profiles may further contain an activity context identifier which is compared to an activity context of the incoming event to apply said activated management profile.

This implementation of the method of the invention may include an initialization phase in which global activity context information to be associated with an incoming event is stored in memory.

Accordingly, before going into a meeting, a user can configure the mobile telephone for a "meeting" activity context, in which case the activated management profile has incoming events notified to the user's personal computer, for example. A user can also configure the mobile telephone for a "mobile telephone inaccessible" activity context, in which case the activated management profile has incoming events notified to the user's wristwatch, for example.

The arrival of an incoming event at the mobile terminal can further be notified directly to the mobile terminal itself, in addition to the notification sent to the terminal(s)-to-be-notified specified in the activated management profile.

In another aspect of the invention the incoming events are filtered prior to being compared with incoming event types, and the activated management profile is applied only to filtered events.

In this case, the method may include an initialization phase in which a criterion for filtering incoming events is stored in memory.

The management profiles may be stored in memory in the mobile terminal or in a fixed unit of a mobile radio network of which the mobile terminal is part.

Finally, the activated management profile may be activated from the mobile terminal itself, and thus very easily by the user.

The invention also provides a mobile telephone constituting a mobile terminal for implementing the above method.

BRIEF DESCRIPTION OF THE DRAWINGS

Other features and advantages of the present invention become apparent in the course of the following description of an implementation of the invention, which is given by way of illustrative and non-limiting example.

In the accompanying drawings.

MORE DETAILED DESCRIPTION

Figure 1:
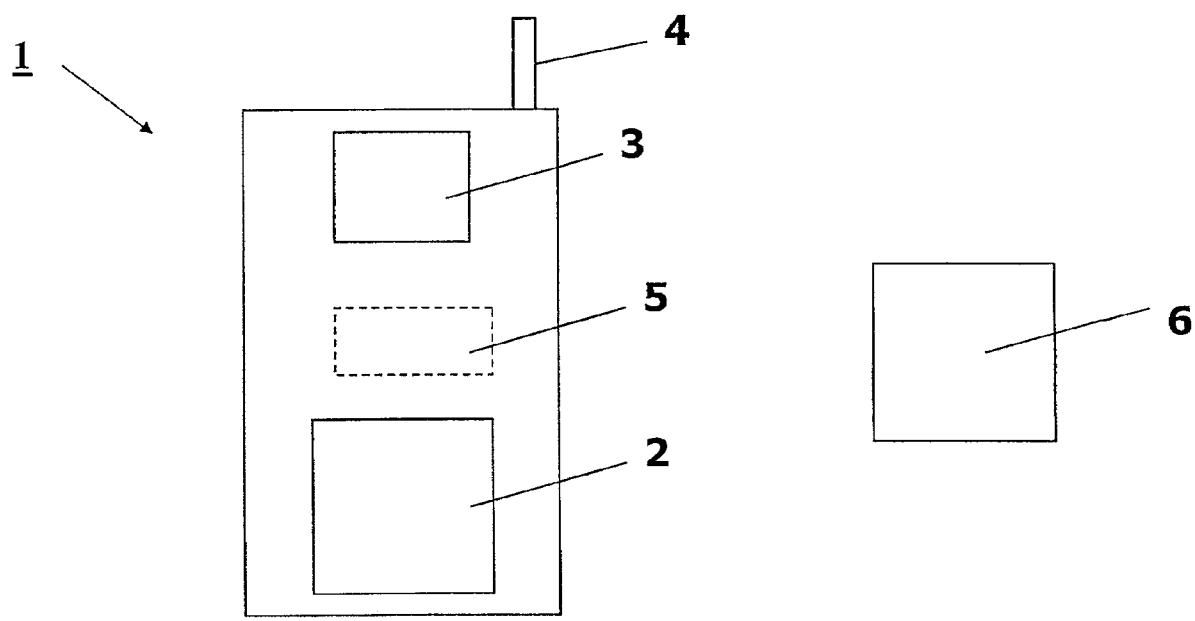
FIG. 1 shows diagrammatically a mobile telephone for implementing the method of the invention.

FIG. 1 shows a mobile telephone 1 for implementing the method of the invention. It comprises:

a keypad 2 for keying data or telephone numbers,
a screen 3 for displaying, in the conventional way, messages, keyed telephone numbers, customization menus, etc.,
an antenna 4 for sending and receiving radio signals, and
a memory 5 (which is part of the subscriber identity module (SIM) card, i.e. part of the terminal 1 itself).

FIG. 1 also shows a terminal-to-be-notified, here a personal computer 6.

According to the invention, a plurality of incoming event management profiles can be stored in the memory 5 by the user of the mobile telephone 1. The user keys the corresponding data via the keypad 2.

How the method of the invention can be implemented to notify the arrival of an incoming event at the mobile telephone 1 is described below with reference to FIG. 2. To this end, there follows a simplified description of an incoming event management profile defined by the user of the mobile terminal 1.

As a general rule, in the invention, management profiles contain an incoming event type identifier and a terminal-to-be-notified identifier. They can additionally contain an activity context identifier.

The terminal-to-be-notified identifier can be the unique identifier of a communication module, for example, such as its Bluetooth address.

For example, in a management profile PG selected here purely by way of example, in a "meeting" activity context, the arrival of any incoming event of the electronic mail (e-mail) message or telephone call type is notified to the personal computer 6. Accordingly, the management profile contains:

two incoming event type identifiers, EM (for the e-mail incoming event type) and CT (for the telephone call incoming event type),
a terminal-to-be-notified identifier PC (for the personal computer terminal-to-be-notified), and
an activity context identifier R (for the "meeting" activity context).

The method of the invention begins with an initialization phase I which comprises a first step 10 for the user to store in the memory 5 the management profile PG defined by the identifiers EM, CT, PC and R described above.

This operation can be effected once and for all, and independently of the other operations of the method of the invention. The user can also modify the management profile or profiles stored in this way at will and create new ones as and when required.

When the user wishes incoming events to be notified in compliance with a given management protocol, for example in compliance with the management protocol PG, this protocol is activated by using the keypad 2 on the mobile telephone 1. Thus the activation step 20 does not necessarily follow on immediately from the storage step 10. Following step 20, the management profile PG is referred to as "activated".

During an operation 30 for storing an activity context CA in memory, the user must indicate the "current" activity context to the mobile telephone 1, for example by activating an activity context in the memory 5.

In the present example, when the user activates the activity context CA in the mobile telephone 1, the method of the invention proceeds in the following manner.

Figure 2:
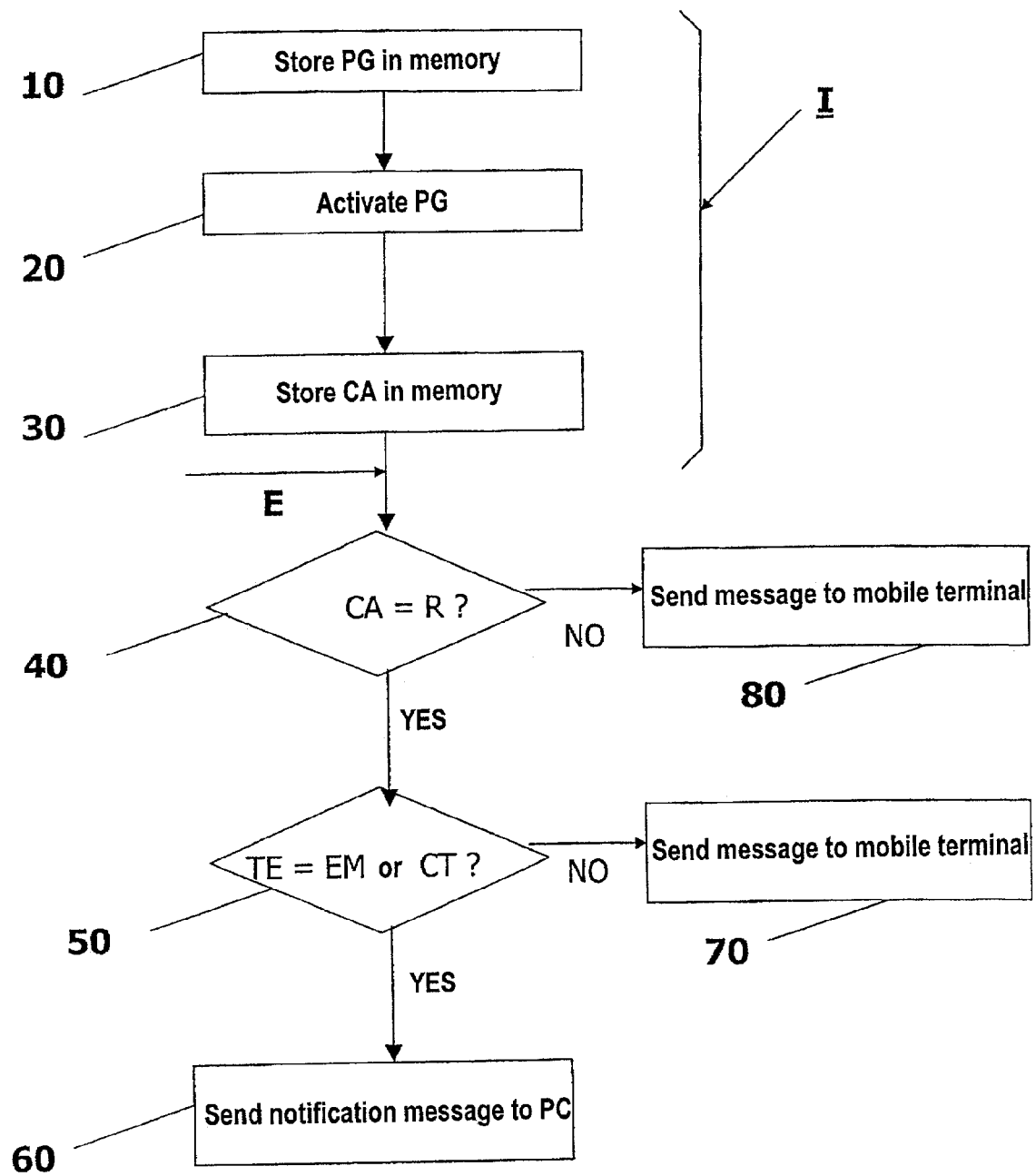
FIG. 2 is a flowchart of the method of the invention.

In a comparison step 40 shown in FIG. 2, if an incoming event E reaches the mobile telephone 1, the telephone compares the current activity context CA with the activity context identifier R of the profile PG, for example using its microprocessor (not shown).

If CA and R are identical, the microprocessor then compares the incoming event type TE with the event type identifiers of the profile PG (comparison step 50 in FIG. 2).

If TE is equal to EM or CT, an incoming event arrival notification message 60 is sent to the personal computer 6 via the antenna 4, i.e. by wireless, for example in compliance with the Bluetooth protocol.

If TE is different from EM and CT, then the arrival of the event E is notified directly to the mobile telephone 1 by a message 70, for example by triggering its ringer or vibrator (if it has one), or by displaying a message on its screen 3.

If CA and R are different, incoming events are notified by a message 80 sent directly to the mobile telephone 1, as indicated above.

The method of the invention is not limited to the implementation and the example just described.

In particular, the invention can use a variety of management profiles.

Also, notification message can be sent as a function of a relative priority of the terminals-to-be-notified, as predefined by the user, or of criteria relating to the accessibility of the terminals.

Finally, any means can be replaced by equivalent means without departing from the scope of the invention.

The invention claimed is:

1. A method of notifying the arrival of an incoming event at a mobile terminal connected by communication means to a terminal-to-be-notified that is separate from said mobile terminal,
which method comprises the following operations at the time of arrival at said mobile terminal of an incoming event identified by an incoming event type:
comparing at said mobile terminal the incoming event type with an incoming event type identifier contained in a previously activated incoming event management profile, and
sending a notification message to said terminal-to-be-notified whose identifier is contained in said activated management profile if the incoming event type corresponds to an incoming event type of said activated management profile.

2. A method according to claim 1, including an initialization phase comprising the following operations:
storing in memory an incoming event management profile containing an incoming event type identifier and a terminal-to-be-notified identifier, and
activating a management profile to indicate that said incoming events must be processed in accordance with the management profile that is activated.

3. A method according to claim 1, wherein said incoming event is chosen from the group comprising reception of a telephone call, a facsimile message, an SMS text message, and an electronic mail (e-mail) message.

4. A method according to claim 2, wherein said incoming event is chosen from the group comprising reception of a telephone call, a facsimile message, an SMS text message, and an electronic mail (e-mail) message.

5. A method according to claim 1, wherein said terminal-to-be-notified is chosen from the group comprising a personal computer, a personal digital assistant, another mobile terminal, a headset, and a wristwatch.

6. A method according to claim 2, wherein said terminal-to-be-notified is chosen from the group comprising a personal computer, a personal digital assistant, another mobile terminal, a headset, and a wristwatch.

7. A method according to claim 1, wherein said communication means include a wireless interface.

8. A method according to claim 2, wherein said communication means include a wireless interface.

9. A method according to claim 7, wherein said notification message is transmitted in compliance with the Bluetooth protocol.

10. A method according to claim 8, wherein said notification message is transmitted in compliance with the Bluetooth protocol.

11. A method according to claim 1, wherein said activated management profile further contains an activity context identifier which is compared with an activity context of said incoming event to apply said activated management profile.

12. A method according to claim 2, wherein said activated management profile further contains an activity context identifier which is compared with an activity context of said incoming event to apply said activated management profile.

13. A method according to claim 11, including an initialization phase comprising storing in memory global activity context information to be associated with an incoming event.

14. A method according to claim 1, wherein the arrival of an incoming event at said mobile terminal is also notified directly to said mobile terminal.

15. A method according to claim 2, wherein the arrival of an incoming event at said mobile terminal is also notified directly to said mobile terminal.

16. A method according to claim 1, wherein said incoming events are filtered prior to said comparison of incoming event types and said activated management profile is applied only to filtered events.

17. A method according to claim 2, wherein said incoming events are filtered prior to said comparison of incoming event ;types and said activated management profile is applied only to filtered events.

18. A method according to claim 16, including an initialization phase comprising storing in memory a criterion for filtering said incoming events.

19. A method according to claim 1, wherein said management profiles are stored in memory in said mobile terminal.

20. A method according to claim 2, wherein said management profiles are stored in memory in said mobile terminal.

21. A method according to claim 1, wherein said management profiles are stored in memory in a fixed unit of a mobile radio network of which said mobile terminal is part.

22. A method according to claim 2, wherein said management profiles are stored in memory in a fixed unit of a mobile radio network of which said mobile terminal is part.

23. A method according to claim 1, wherein said activated management profile is activated from said mobile terminal.

24. A method according to claim 2, wherein said activated management profile is activated from said mobile terminal.

25. A mobile telephone constituting a mobile terminal for implementing the method according to claim 1.

26. A mobile telephone constituting a mobile terminal for implementing the method according to claim 2.

* * * * *